2

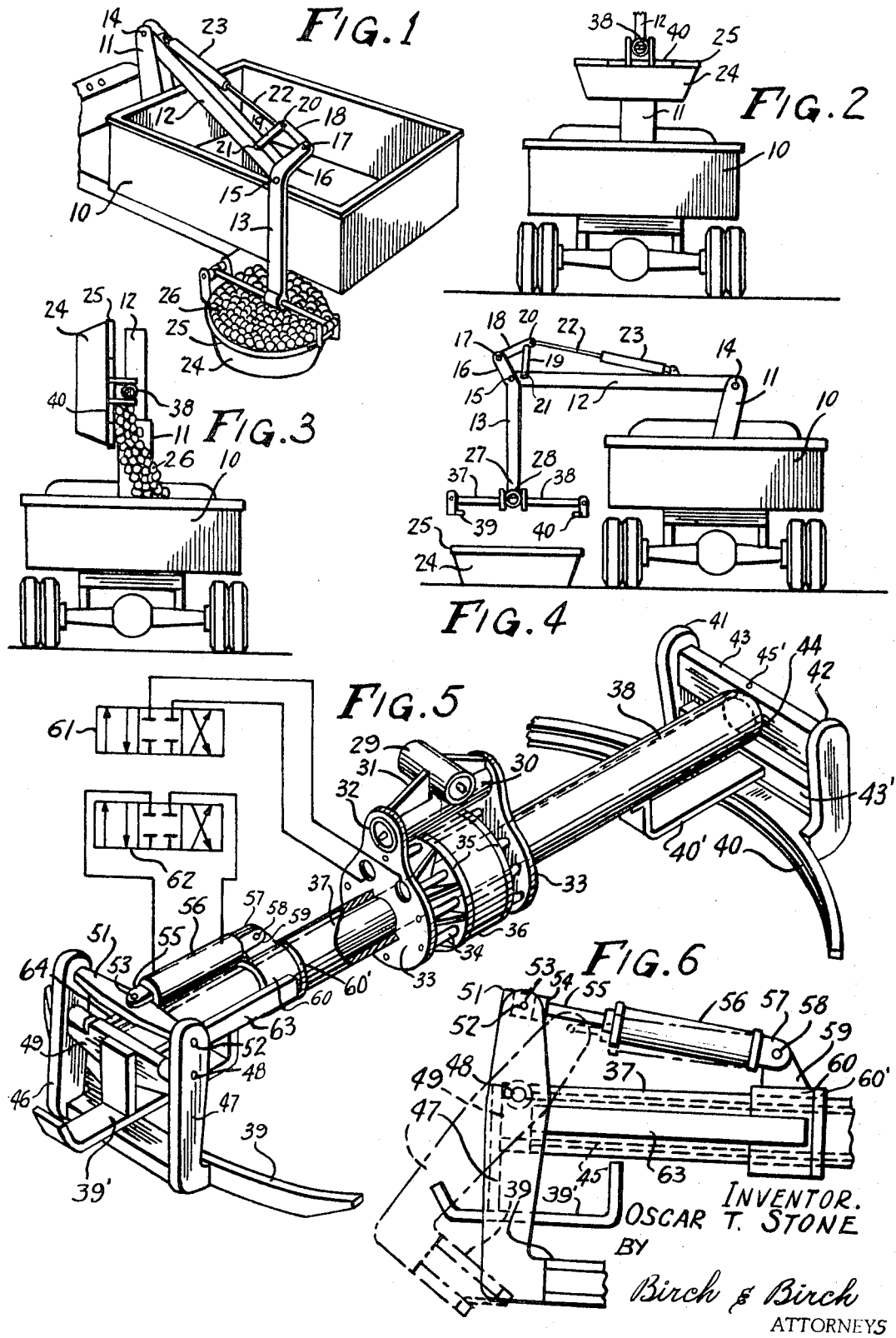

United States Patent Office 3,447,705
Patented June 3, 1969

3,447,705
PICK-UP AND DUMP MECHANISM
Oscar T. Stone, P.O. Box 2644,
Lakeland, Fla. 33803
Filed Oct. 12, 1967, Ser. No. 674,963
Int. Cl. B65g *65/02*
U.S. Cl. 214—302                    5 Claims

ABSTRACT OF THE DISCLOSURE

Mechanism for attachment to an elevating lever or boom on a truck and with such mechanism usable for clamping onto a container such as that in which citrus or other fruit is collected for picking up the container and for tilting the container to discharge the contents thereof.

BACKGROUND OF THE INVENTION

Field of the invention

The invention is particularly concerned with the harvesting of fruit such as that of the citrus variety or other fruits or objects obtained by pickers or workmen and deposited in a container in bulk, which container with its load is moved for processing, marketing, or other purpose, although the invention is susceptible of use wherever a container for bulk material is lifted and the material subsequently discharged.

Description of the prior art

Various types of devices have been produced for transferring citrus and other fruits and articles from one place to another utilizing both hand and power equipment; however, these have required substantial labor or workmen greatly affecting the cost of operation.

It is an object of the invention to provide mechanisms which can be attached to and carried by the boom of a tractor and operated from the tractor for gripping and taking hold of a container of material in bulk and moving and transferring such container to another location and thereafter tilting the container to discharge the contents, and thus reducing the cost of handling.

Another object of the invention is to provide a relatively simple, practical and efficient mechanism for gripping, elevating, and thereafter tilting a container of a size too large for manual handling, and operable from the power of the tractor, such as, for example, by means of a hydraulic system.

SUMMARY

The invention is a pick-up and dump mechanism for attachment to a lifting lever or boom carried by an automotive vehicle such as a truck or tractor with a lift bar, and to which container gripping mechanism is attached, for engaging and lifting, a container of citrus fruit or other substance in bulk, and with means for rotating the gripping mechanism to tilt the container and discharge the contents thereof, both the gripping and tilting being operations of the mechanism.

BRIEF DESCRIPTION OF THE DRAWINGS

FIG. 1 is a perspective illustrating the invention applied to a truck and with the parts in position to pick up a container of citrus fruit;

FIG. 2, an end elevation of the truck with the container end above which can be tilted to discharge the contents;

FIG. 3, a similar view with the container tilted;

FIG. 4, a rear end elevation prior to the engagement of the container for lifting the same;

FIG. 5, an enlarged detailed perspective of the gripping and tilting mechanism; and FIG. 6, a further enlarged side elevation of the tiltable end of the gripping mechanism.

DESCRIPTION OF THE PREFERRED EMBODIMENT

With continued reference to the drawing, a truck may have a body 10 and be equipped with a boom consisting of arms 11, 12 and 13, the arms 11 and 12 being connected by a pivot 14, and the arms 12 and 13 being connected by a pivot 15. Means is provided for rotating the arm 11 and for pivoting the arm 12 relative thereto for raising and lowering the arm 13 all of which is conventional.

In order to pivot the arm 13 about the pivot 15 the arm 13 is provided with an angular extension 16 and a pivot 17 which with levers 18 and 19 form generally a parallelogram, the lever 18 being connected by a pivot 20 to the lever 19, and the lever 19 being connected by a pivot 21 with the arm 12. A piston 22 has one end connected to the pivot 20 and its opposite end extending into a hydraulic cylinder 23 attached to the arm 12 so that when the cylinder 23 is supplied with hydraulic fluid the arm 13 will be moved relative to the arm 12.

At the lower end of the arm 13 is carried mechanism for gripping opposite sides of a container 24 beneath an outwardly turned rim 25, such container being illustrated in FIG. 1 as filled with citrus fruit such as oranges 26. The arm 13 has a lower bifurcated end 27 in which is carried a pivot 28 which extends through a sleeve 29 attached at right angles to a shaft 30, gussets 31 being employed for reinforcement. The ends of the shaft 30 are fixed in openings 32 of generally pear-shaped plates 33. The plates 33 are attached by pins 34 to side plates 35 which are parts of the housing of a rotary actuator 36. The plates 33 are secured, as by welding, to the respective inner ends of elongated sleeve portions 37 and 38, see FIG. 5.

On the ends of a rotor shaft 45 extending through the sleeve portions 37 and 38 and the plates 33 and side housing plates 35 are suitable container engaging co-operative clamps 39 and 40. These clamps are relatively rigid and are adapted to fit beneath the rim 25 and engage the sides of the container 24, to thereby grip the same firmly so the container can be picked up and subsequently tilted by activation of rotary actuator or motor 36 to have its contents discharged into the truck body 10 or other receiver, see FIGS. 3 and 5.

The clamp 40 may be fixed relative to clamp 39 and is carried by a frame composed of spaced uprights 41 and 42 connected by a cross bar 43 in which an end of the rotor shaft 45 is received and suitably journalled. Thus, the clamp 40 is fixed to the shaft 45 within the sleeve portion 38 abutting and welded to the adjacent plate 33 and the flat face of bar 44 at respective ends thereof.

In order to allow for gaging the gripping action of the container flange 25 by the clamp members 39 and 40, each clamp member has associated therewith a spacer bracket 39' and 40', see FIGS. 5 and 6. These brackets are suitably secured as by welding or the like to cross bars 43 and 49, respectively, so as to rotate or turn therewith during the turning of the clamp members 39 and 40. Spacer brackets 39' and 40' are arranged and shaped so as to rotate freely around the fixed sleeves 37 and 38 when the clamp members are turned to tilt the container 24.

Spaced pivot means 48 are located between and intermediate the ends of spaced uprights 46 and 47 of the clamp member 39 on cross bar 49 pivoted to the end of fixed sleeve portion 37 adjacent the end of rotor shaft 45, see FIG. 6. Also, spaced vertically from the pivots 48 is a second cross bar 51 secured at points 52 to the upper ends of the respective uprights 46 and 47. The cross bar 51 is secured by a pivot 53 on the bifurcated end of a piston 55 and a rod 54 is carried by the exterior end of the piston and extends into a fluid cylinder 56, the exterior end being attached by a bifurcated end 57 secured by a pivot 58 to a lug 59 carried by a band or ring 60 slidably and turnably mounted on the relatively fixed sleeve portion 37. This movable band 60 is backed by a stop ring 60' welded to sleeve 37 and the band has welded to it, diametrically on each of the ends of spaced side flat bars 63 and 64, while the opposite ends of the respective bars are welded to the cross bar 49 to retain the cylinder 56 in proper alignment with the second cross bar 51 at any degree of rotation of the clamp members 39 and 40 during the clamp tilting operation.

Thus, by the connections of the cylinder 56 to the movable clamp 39 and to the end of the shaft 45 extending through the sleeve 37, the clamp 39 may first be pivoted to clamping engagement with flange 25 of the container 24 and then, subsequently, the clamping members turned in unison by the rotor shaft 45 to tilt the container 24, see FIGS. 3 and 6.

In a preferred arrangement the clamp member 40 includes a counter balance or suitably weighted portion including a relatively heavy cross bar 43' to tilt the clamp member a few degrees downward when the clamp member 39 is open to non-gripping position. This counter balance makes it easier to position the clamp assembly on the container 24, see numeral 43' in FIG. 5.

Diagrammatically there is illustrated, in FIG. 5, distribution valve means 61 and 62 for controlling a supply of pressure fluid to the rotor on rotor shaft 45 of the rotary actuator 36. The rotary actuator 36 may be any suitable type of rotary fluid motor and includes a usual rotor, not shown, carried by the rotor shaft 45 in casing 36. The pear-shaped plates 33 are each suitably mounted as by welding to the inner ends of sleeves 37 and 38, and the shaft 45 extends through the actuator casing 36 and side walls 35 and through the sleeves to each respective clamp 39 and 40, see FIG. 6.

In operation, the cylinder 56 is operated by its valve means prior to operation of the rotary actuator 36, whereby the clamp member 39 is moved toward clamp 40 to clamp the container 24 at flange 25. The hoist mechanism is actuated to raise the clamped container to a dumping position with respect to the truck body 10. When in this position, the rotary actuator 36 is energized to cause the same to impart tilting motion by rotation of the rotor shaft 45, so as to turn band 60, cylinder 56 and the clamp members, to thereby tilt the container to dump its contents, see FIG. 3. It is believed clear that when the valves 61 and 62 are in the intermediate positions, no fluid can flow to either the clamp control hydraulic cylinder 56 or the rotary actuator 36, but when the valves are moved endwise, fluid will be allowed to flow into the respective units 56 and 36 to control the same, as is well known in the art.

It will be apparent from the foregoing that simple, practical, efficient pick-up and tilt mechanism is provided by means of which a container of citrus or other commodity held in bulk may be readily picked up, swung or transferred to another location and dumped in a minimum of time and with a minimum of effort.

What is claimed is:

1. Apparatus for use with lift mechanism comprising a member for attachment to said lift mechanism, first actuator means carried by said member at substantially right angles thereto, shaft means being axially and rotatably connected to said actuator means; spaced clamp means carried by said shaft means for engagement with a container, one of said clamp means being fixed transverse an end of said shaft means and another clamp means transverse the opposite end of said shaft means being movable outwardly relative to the shaft means and toward and from said one of said clamp means for contact and release of a container, second actuator means axially mounted with respect to said shaft means and connected to the movable clamp means pivotally mounted transverse the end of said shaft means for moving it toward and from said fixed clamp means, and power means for said first and second actuator means.

2. The invention of claim 1, wherein said movable clamp means is pivotally mounted on said shaft means and said first actuator means is a rotatable motor to angularly dipslace said clamp means and said shaft means, said power means for said first and second actuator means being hydraulic means including manually controlled valve means for selective operation of said actuator means.

3. The invention of claim 1, wherein said first actuator means is a rotary fluid motor and said second actuator means is a reciprocating fluid motor.

4. The invention of claim 1, wherein said respective clamp means each carry a spacer bracket to position the clamp means uniformly in relation to the rim of a container to be picked up.

5. The invention of claim 1, wherein the said relatively fixed clamp means is counterbalanced, to thereby tilt divergently downward from the moveable clamp means when in non-clamping position.

References Cited

UNITED STATES PATENTS

| 1,824,339 | 9/1931 | Foradas et al. | 214—313 X |
| 2,653,725 | 9/1953 | Dodge | 294—104 X |
| 3,285,651 | 11/1966 | Ellis | 294—104 |

HUGO O. SCHULZ, *Primary Examiner.*

U.S. Cl. X.R.

214—147; 294—104